T. MARSH & J. BERNEY.
EGG BEATER.

No. 104,174. Patented June 14, 1870.

Witnesses:
Chas. L. Wilson
Henry Millygatt

Inventors
Thomas Marsh
James Berney
By their attorney N. Crawford

2 Sheets—Sheet 2.
T. MARSH & J. BERNEY.
EGG BEATER.
No. 104,174.  Patented June 14, 1870.
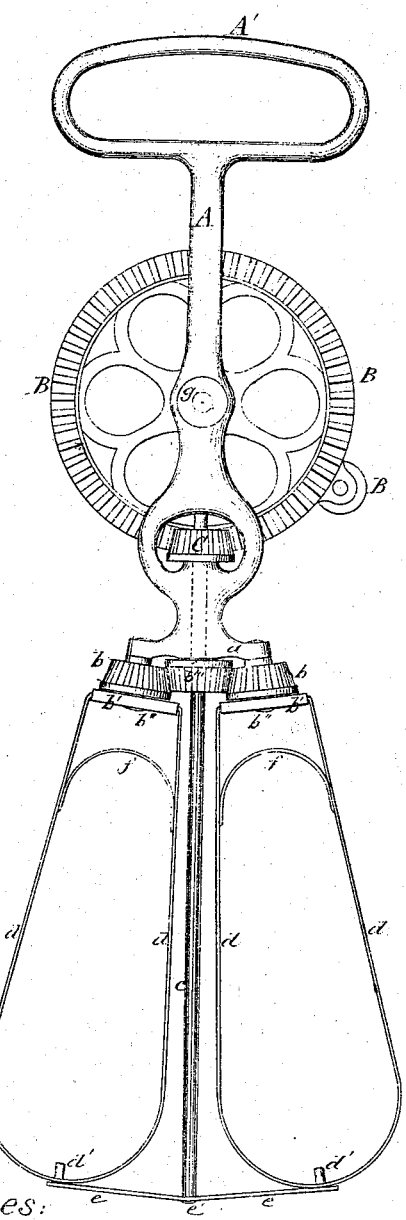
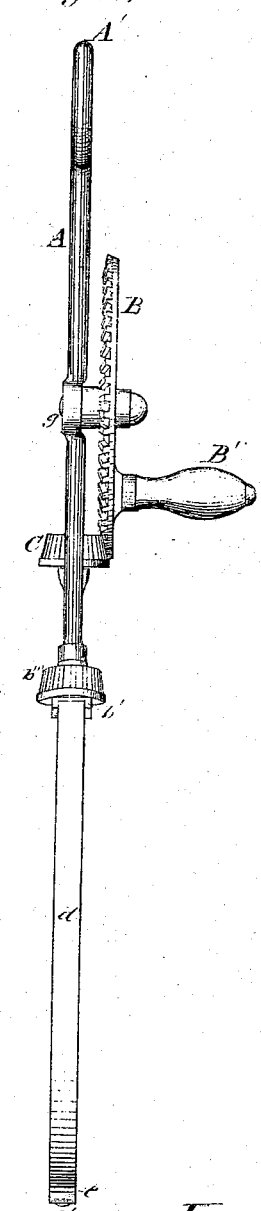
Witnesses:
Chas. E. Wilson
Henry N. Myggatt
Inventors:
Thomas Marsh
James Berney
By their attorney N. Crawford

United States Patent Office.

THOMAS MARSH AND JAMES BERNEY, OF PAWTUCKET, RHODE ISLAND.

Letters Patent No. 104,174, dated June 14, 1870.

IMPROVED EGG-BEATER.

The Schedule referred to in these Letters Patent and making part of the same.

*To all whom it may concern:*

Be it known that we, THOMAS MARSH and JAMES BERNEY, of Pawtucket, in the county of Providence, in the State of Rhode Island, have invented a new and useful Improvement in Egg-Beaters, of which the following is a specification.

The object of this invention is to construct an egg-beater with two revolving beaters, in such manner as will overcome objections that existed previous to this invention.

It has been found that where a single revolving beater has been used, the rapid revolutions of which, in order to break up and entirely destroy the tenacity with which the albumen of the egg is so intimately connected, will, by its centrifugal force, throw the substance of the egg to the inside of the dish containing the egg and the beater, and away from the action of the beater, and without doing what was intended it should do, and when two beaters have been used, they revolve in such direction that the motion of the two is unlike what is hereafter described as the invention; nor do such beaters produce the effect intended.

This invention consists in the construction of the parts, and their arrangement, with relation to each other, so as to produce the effect desired.

In the drawing—

Figure 3 is a modification of fig. 1, and

Figure 4, a transverse view of fig. 3.

A is a metal frame that supports the operating parts, and at its upper end, for convenience of holding, has a loop-handle, A'.

B is the main driving gear-wheel, revolving on an axis made fast to frame A at $g$, and is made to revolve by the crank-handle B'.

The gear-wheel B gears into pinions $b\ b$, that revolve with their axles in cross-bar $a$ at the bottom of frame A.

These pinions $b\ b$ have their teeth inclined with relation to their axes, and so as to gear into and freely work with the teeth on the wheel B, and overcome the difference caused by the axis of rotation of wheels $b\ b$ and beaters $d\ d$ in not being coincident with radial lines from the center of wheel B to the point where wheels $b\ b$ gear into wheel B.

On the under side of these pinions $b\ b$ a yoke or cross-piece, $b'$, is cast on or made fast to, and to which are attached the revolving beaters $d\ d$.

$c$ is a supporting-rod, made fast in and at the lower end of frame A, its axial center being a continuation of the center of frame A, and extends below the lower ends of the beaters $d\ d$ to a cross-bar, $e$, and is made secure thereto at point $e'$.

The beaters $d\ d$ are made of sheet metal that will not rust, bent at their bottom ends to the proper circle, the two upper ends made fast to the under side of the yoke or cross-pieces $b'\ b'$, while their sides are straight from the ends of the cross-pieces $b'\ b'$ to the point where the semicircle commences that forms the bottom of the beater, but gradually grow wider from their top ends, or where they are fast to the yoke, to the point where they bend to form the half-circle at their bottom ends.

These beaters turn freely on pivot-pins $d'\ d'$ at their bottom ends, and revolve with pinions $b\ b$.

Pivot-pins $d'\ d'$ pass through the bottom cross-bar $e$, and are made fast thereto, and keep the bottom ends of the beaters in place, and allow them to turn on these pivots freely.

In order to strengthen the sides of the beaters, and secure them from bending or springing, a half-circle brace, $f$, is placed near to their upper ends and between the sides, and made fast thereto.

To operate the beater, gear-wheel B may be turned in either direction, and will give a rapid revolution to the pinions $b\ b$ and beaters $d\ d$, and in such direction as to prevent the substance of the egg from being thrown away from the action of the beaters, for while both beaters revolve in the same direction, yet the sides of the beaters adjacent to each other, as they approach, are traveling in opposite directions, which has the tendency and does act to separate the substance of the egg much quicker and more thorough than is done by either a single beater or by two or more beaters that revolve in a different manner from that herein described.

Figure 1:
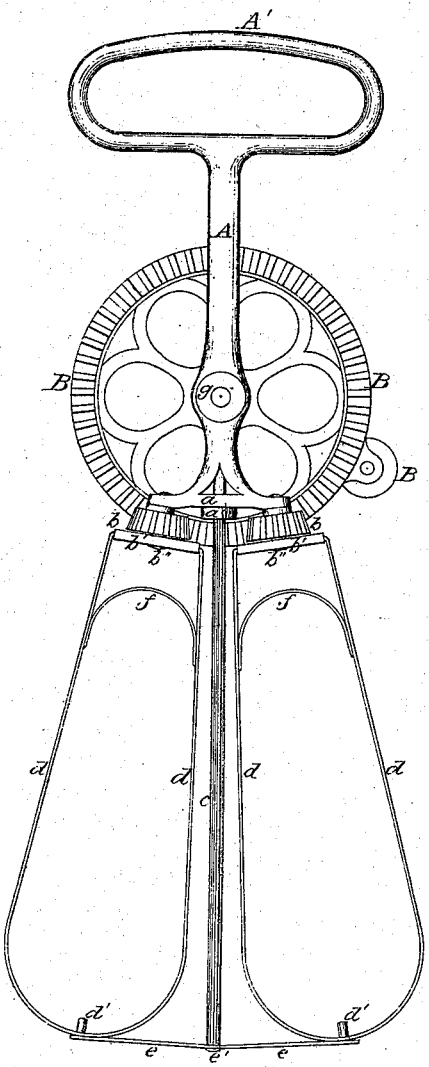
Figure 1 is an upright sectional view of the beater.
Figure 2:
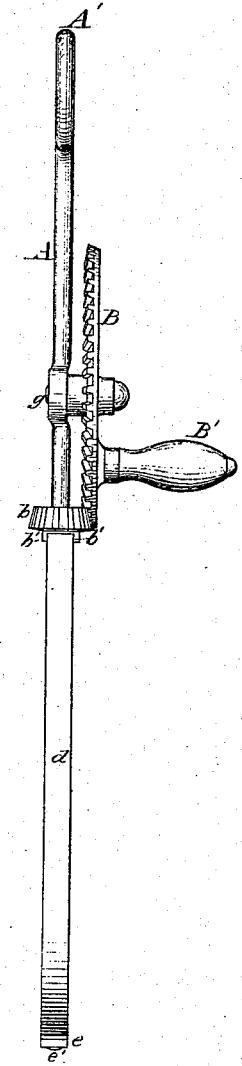
Figure 2 is a transverse view of the same.

This motion is produced upon the beaters by the use of the single driving gear-wheel gearing into and revolving the two pinions and beaters; but it is evident that other arrangements of gear-wheels will produce the same effect, as, for instance, wheel B may gear into and revolve a pinion upon a shaft where another pinion is attached, the second pinion acting as the driving-wheel to the pinions that are attached to the beaters, and the effect will be the same, as is seen in the modification represented in figs. 3 and 4, where a gear-wheel or pinion, C, is made by wheel B to turn a shaft, $c$, which freely revolves in proper bearings in frame A and bottom cross-bar $e$, and has pinion $b'''$ attached to and revolve with it and give revolution to the pinions $b\ b$ and to the beaters $d\ d$, but we greatly prefer the construction and arrangement of gear-wheels as represented in figs. 1 and 2, to give the described motion to the beaters, for, by such arrangement, a less number of gear-wheels is used, and, as a consequence, reduces the friction and saves the power that would be used to overcome the extra amount of friction.

We do not broadly claim for the gear that revolves the beaters, nor the beaters, as gear-wheels have been used for revolving the beaters, previous to our invention.

Having thus described our invention,

What we claim, and desire to secure by Letters Patent, is—

1. The combination, in an egg-beater, of the gear-wheel B, pinions $b\ b$, and beaters $d\ d$, when the parts are constructed to operate in the manner described.

2. The combination of the gear-wheels B C $b'''$ and $b\ b$ with the beaters $d\ d$, constructed and arranged to operate in the manner described.

3. The egg-beater, constructed as above described.

THOMAS MARSH.
JAMES BERNEY.

Witnesses:
JAMES CALLAGHAN,
ROYAL LEE.